No. 661,614. Patented Nov. 13, 1900.
A. H. MARKS.
VEHICLE TIRE.
(Application filed Mar. 31, 1900.)
(No Model.)
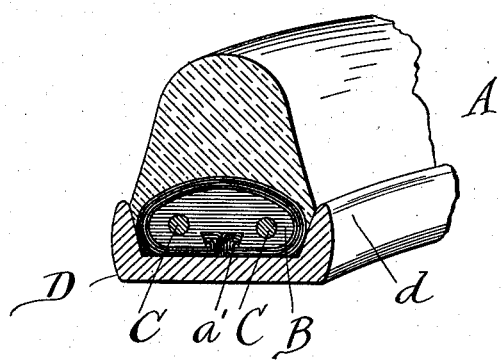
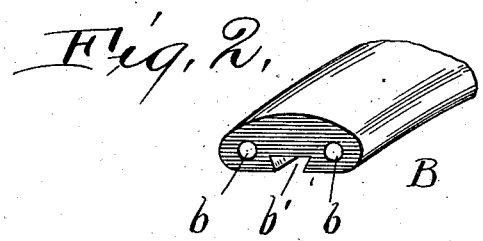
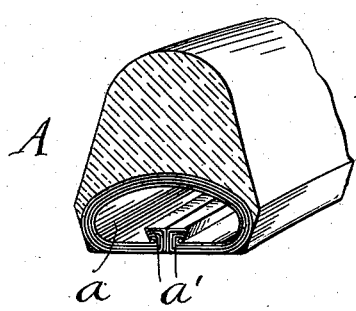
Witnesses
E. B. Gilchrist
F. D. Ammen
Inventor,
Arthur H. Marks,
By his Attorneys,
Thurston & Bates.

UNITED STATES PATENT OFFICE.

ARTHUR HUDSON MARKS, OF AKRON, OHIO, ASSIGNOR TO THE DIAMOND RUBBER COMPANY, OF SAME PLACE.

VEHICLE-TIRE.

SPECIFICATION forming part of Letters Patent No. 661,614, dated November 13, 1900.

Application filed March 31, 1900. Serial No. 10,930. (No model.)

*To all whom it may concern:*

Be it known that I, ARTHUR HUDSON MARKS, a citizen of the United States, residing at Akron, in the county of Summit and State of Ohio, have invented a certain new and useful Improvement in Vehicle-Tires, of which the following is a full, clear, and exact description, reference being had to the accompanying drawings.

My invention relates to the type of rubber tires for vehicle-wheels which are held on a flanged rim by means of wires embedded in the tire. In tires of this sort the holes in which the wires lie soon become worn, wherefore the wires can no longer be relied upon to perform their functions. The tires are therefore useless and must be discarded, notwithstanding the fact that in many cases the tires are in other respects adapted for considerable use.

The object of my invention is to produce a tire which when the holes in which the wires lie become too much enlarged to permit the wires to perform their functions does not become entirely useless.

To that end the tire consists of an annular outside member containing a longitudinal recess and a removable core fitted to said recess and containing longitudinal holes in which the wires lie, said parts being constructed substantially as described, whereby when the tire is on the wheel-rim its parts are securely locked together.

In the drawings, Figure 1 is a sectional perspective view of a part of the tire embodying my invention and of a flanged rim upon which it is adapted to be held. Fig. 2 is a sectional perspective view of a part of the core, and Fig. 3 is a sectional perspective view of a part of the outer section of the tire.

Referring to the parts by letters, A represents the outside member, in which is the longitudinal recess $a$, which extends throughout its length. These tires are commonly made in long straight strips, which are bent into annular form when they are put onto the wheel-rims. The finished tire, however, is an annulus, and consequently the recess $a$ above referred to may properly be called an "annular" recess. The outside member is split through what will be the inner periphery of the finished tire, said split extending through to the recess $a$ for the purpose of making it easy to insert or remove the core B. This core fits and fills this recess and is in a completed tire of annular form. In it are formed the longitudinal holes $b$, in which the fastening-wires C are inserted.

When a tire having the described characteristics is placed upon a flanged wheel-rim— as, for example, the rim D—and the wires C are tightened and their ends fastened in the usual or any suitable manner, the core B is obviously held upon said rim and it in turn holds the outer section A down upon the rim, while the rim-flanges $d$ tend to prevent the lateral spreading of the side of said outer section. Greater security against this lateral spreading of the outer section is provided by means of the ribs $a'$, which are formed on the outside member at the edges of the slit therein and which project into the recess $a$ and enter a groove $b'$, formed in the core to receive them.

Whatever wear is occasioned by the wire is suffered by the core alone, and therefore if the wire-holes become too large this core may be removed and another core substituted. The outside member may be used until it is worn by means other than the retaining-wires. This core is preferably made of a plurality of plies of fabric and rubber or rubber-covered fabric, substantially as shown in the drawings, which construction generally strengthens it and renders it much more long-lived and capable of resisting the wear of the wires than it would be if made of rubber alone. The outer section A is also strengthened by making that part thereof which surrounds the core A out of a plurality of plies of fabric and rubber or rubber-covered fabric, substantially as shown.

Having described my invention, I claim—

1. In a rubber tire, the combination of an outside member containing a longitudinal recess, and having its inner wall slitted, with a removable core which is fitted into said recess, and longitudinal fastening-wires in said core, substantially as specified.

2. In a rubber tire, the combination of an outside member containing a longitudinal recess, and having its inner wall slitted, and having inwardly-extended ribs at the edge of the slit, with a core fitted to said recess and having a groove which receives said ribs, and longitudinal fastening-wires in said core, substantially as specified.

3. In a rubber tire, the combination of an outside member containing a longitudinal recess and having its inner wall slitted, said section containing, in that part thereof which surrounds said recess, a plurality of plies of fabric, with a core fitted to said recess, and longitudinal fastening-wires passing through said core, substantially as specified.

4. In a rubber tire, the combination of an outside member containing a recess, and having its inner wall slitted, with a core fitted to said recess and made up of a plurality of plies of rubber and fabric, and longitudinal fastening-wires in said core, substantially as specified.

In testimony whereof I hereunto affix my signature in the presence of two witnesses.

ARTHUR HUDSON MARKS.

Witnesses:
N. J. ALLEN,
O. S. HART.